(12) United States Patent
Hahn

(10) Patent No.: US 6,847,727 B1
(45) Date of Patent: Jan. 25, 2005

(54) INFRARED MONITORING SYSTEM HAVING VARIABLE ASSIGNMENT OF GREY SCALE VALUES

(75) Inventor: Wolfgang Hahn, Schwabhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 501 days.

(21) Appl. No.: 09/641,755

(22) Filed: Aug. 21, 2000

(30) Foreign Application Priority Data

Aug. 20, 1999 (GB) .............................................. 9919679

(51) Int. Cl.⁷ ............................ G06K 9/00; H04N 7/18; H04N 9/47; H04N 5/33; G09G 3/30; G09G 3/36; G09G 5/10
(52) U.S. Cl. ......................... 382/104; 348/164; 348/83; 345/77; 345/89; 345/690
(58) Field of Search ................................ 382/103, 104; 250/334; 348/83, 164–168, 35, 28, 686, 603, 673, 365; 374/124, 189; 345/617, 77, 89, 207, 690, 699, 214

(56) References Cited

U.S. PATENT DOCUMENTS

| | | | | |
|---|---|---|---|---|
| 3,742,136 A | * | 6/1973 | Olsson ........................ | 348/164 |
| 3,869,565 A | * | 3/1975 | Olsson ........................ | 348/25 |
| 4,187,519 A | * | 2/1980 | Vitols et al. .................. | 348/28 |
| 4,864,392 A | | 9/1989 | Sato ............................. | 358/80 |
| 5,001,558 A | * | 3/1991 | Burley et al. ................ | 348/164 |
| 5,063,607 A | * | 11/1991 | FitzHenry et al. .......... | 382/274 |
| 5,355,224 A | * | 10/1994 | Wallace ....................... | 359/631 |
| 5,619,036 A | | 4/1997 | Salvio et al. ................ | 250/330 |
| 5,737,032 A | * | 4/1998 | Stenzel et al. .............. | 348/649 |
| 5,760,398 A | * | 6/1998 | Blackwell et al. .......... | 250/332 |
| 5,811,815 A | * | 9/1998 | Marshall et al. ....... | 250/370.06 |
| 6,292,228 B1 | * | 9/2001 | Cho ............................ | 348/603 |
| 6,476,391 B1 | * | 11/2002 | Zhang ........................ | 250/330 |

FOREIGN PATENT DOCUMENTS

GB    2 225 688 A    11/1989
WO    WO 96/38319    12/1996

OTHER PUBLICATIONS

Caillas, "Thermal Imaging for Autonomous Vehicle in Outdoor Scenes," IEEE, IROS '90, pp. 651–658.*
Evans, "Simulation in Infrared Imaging: Using Electrical Circuit Principles to Model Heat Transfer," IEEE, 1991, pp. 907–913.*
Beier et al., "Measurement and modeling of infrared imaging systems at conditions of reduced visibility (fog) for traffic applications," 1994, Proc. SPIR, vol. 2223, p. 175–186—Abstract Only.*

* cited by examiner

*Primary Examiner*—Daniel Miriam
*Assistant Examiner*—Shefali Patel
(74) *Attorney, Agent, or Firm*—Crowell & Moring LLP

(57) ABSTRACT

A monitoring system suitable for a vehicle has a display which displays an image of the road area traveled by the vehicle. The system further comprises a controller which is capable of allocating differing sets of grey values held in its memory to the objects in the image. Changes in the allocation of grey values are made in response to a user input, which in a preferred embodiment comprises a grey value allocation switch.

9 Claims, 3 Drawing Sheets

| TEMPERATURE | | HIGH | LOW |
|---|---|---|---|
| GREY VALUE ASSIGNMENT | 1 | BRIGHT | DARK |
| | 2 | DARK | BRIGHT |
| | 3 | BRIGHT | BRIGHT |
| | 4 | DARK | DARK |

| TEMPERATURE | HIGH | LOW |
|---|---|---|
| 1 | BRIGHT | DARK |
| 2 | DARK | BRIGHT |
| 3 | BRIGHT | BRIGHT |
| 4 | DARK | DARK |
| GREY VALUE ASSIGNMENT | | |

FIG. 3

INFRARED MONITORING SYSTEM HAVING VARIABLE ASSIGNMENT OF GREY SCALE VALUES

BACKGROUND AND SUMMARY OF THE INVENTION

This application claims the priority of British patent document 9919679.2, filed 20 Aug. 1999, the disclosure of which is expressly incorporated by reference herein.

This invention relates to a monitoring system that includes a monitor means arranged to display an image generated using an infrared detection means. The monitoring system according to the invention is suitable for use, among other applications, in a motor vehicle.

Infrared transducers, especially those in the 10 μm wavelength range, generate an image in grey values using the temperature distribution of objects and their background, typically with 8 bit resolution. For this purpose, there must be an assignment of a grey value to each temperature interval. The resulting signal, which may be video, can then be presented on a head-up display (HUD) or on a monitor as, for example, a black and white image.

The assignment of grey values to temperature intervals has generally been established such that brighter grey values relate to higher temperatures and darker grey values relate to lower temperatures. Using such an assignment of grey values, a person can usually be distinguished quite clearly against a background having a dark grey value. If, however, a user of a vehicle wishes to use such a system to detect the course of a road he is trying to follow, the colder street edgings/kerb stones and the road surface become the darker images and the warmer background of the roadside verges become brighter on the monitor or in the HUD.

It is a problem with some prior art systems that, depending on the extent of the temperature difference, this picture may prove to be contrary to the desired contrast for efficient road surface monitoring.

One attempt to overcome this problem is disclosed in European patent document EP 0 873 011, in which the grey values of a digital infrared camera are changed using correction parameters, based on a comparison of grey values to the average. This system, however, may not prove suitable for all driving situations and in addition does not give a user the option of choosing an assignment of grey values which suits his or her particular wishes or eye sight requirements.

It is an object of this invention to provide an improved monitoring system of the type described above.

This and other objects and advantages are achieved by the monitoring system according to the invention, which includes a monitor device arranged to display an infrared image, and which includes means for changing the assignment of grey values to the temperature of objects in the image in response to a user operated input. Such input may comprise a multi-position switch, each position of which is arranged to assign a different set of grey values to high and/or low temperatures; or alternatively, it may comprise a voice operated controller arranged to assign a different set of grey values to high and/or low temperatures in response to each of a pre-defined set of voice commands.

Additional changes may be made, or manual changes altered, automatically in response to a driving situation—assessment unit, which may include an input from a navigation.

The invention also provides a vehicle including a monitoring system according to the invention.

Other objects, advantages and novel features of the present invention will become apparent from the following detailed description of the invention when considered in conjunction with the accompanying drawings.

BRIEF DESCRIPTION OF THE DRAWINGS

FIG. 3 is a table which shows examples of changes which can be made by the monitoring system of FIG. 1 to the allocation of grey values to temperature levels of monitored objects, such as those in FIG. 2.

DETAILED DESCRIPTION OF THE DRAWINGS

Figure 1:
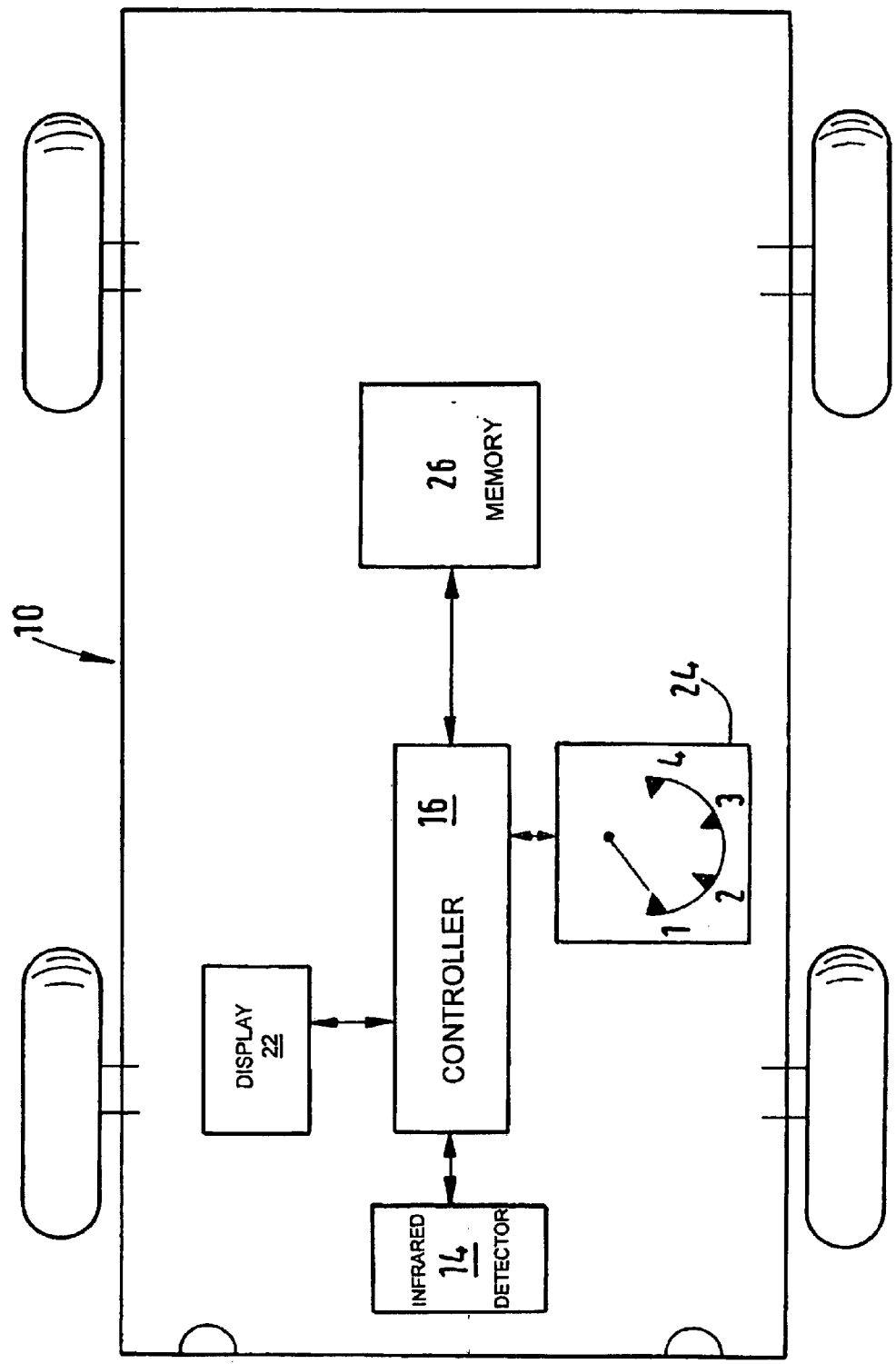
FIG. 1 is a schematic diagram of a vehicle which includes a monitoring system in accordance with an embodiment of the invention.
Figure 2:
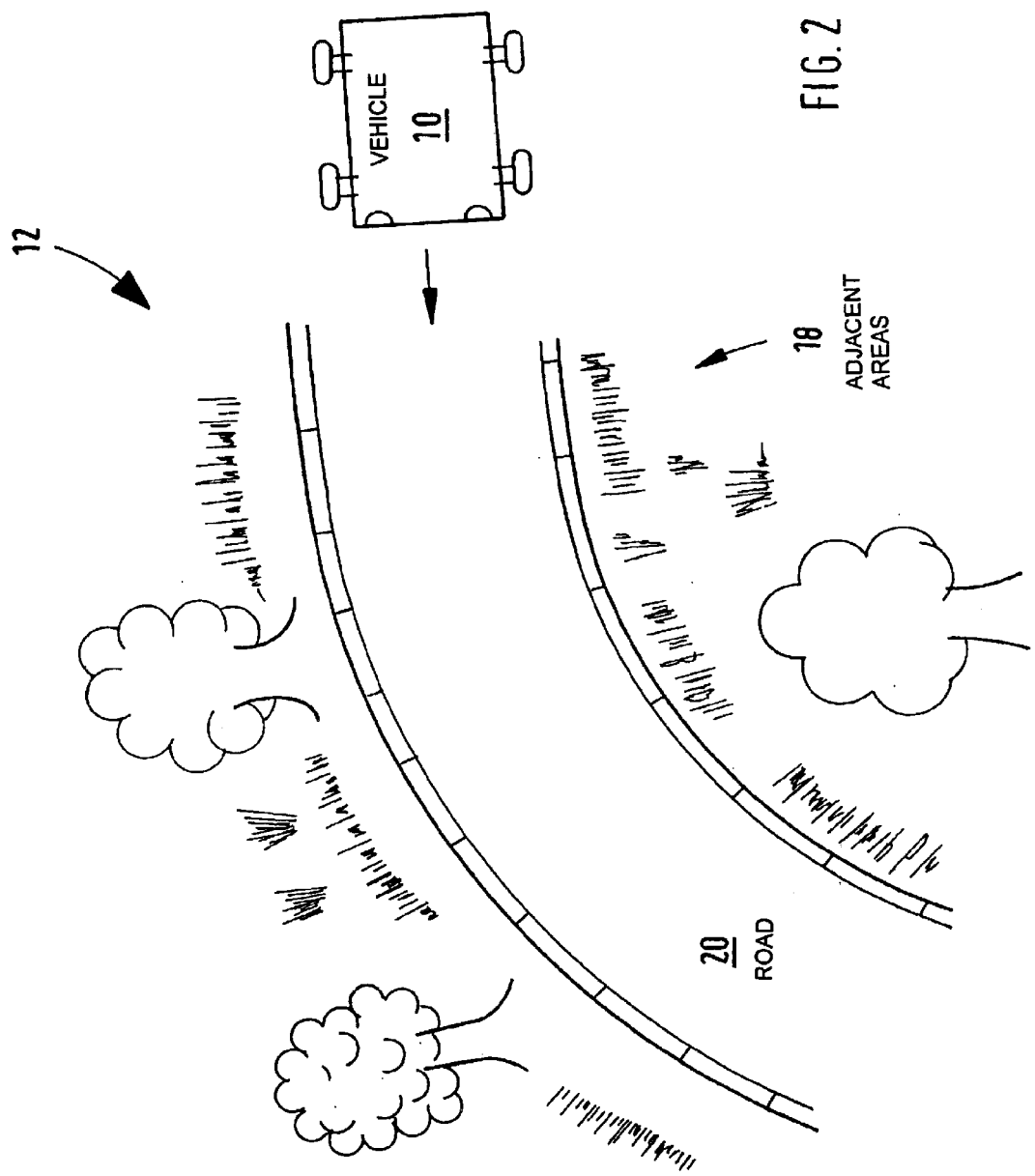
FIG. 2 represents a driving situation of the vehicle of FIG. 1.

Referring to the figures, a vehicle 10 includes a monitoring system which is used to monitor the road area 12 substantially in the direction of travel of the vehicle 10. The road area 12 is monitored by an infrared detector 14 which provides to a controller 16 the temperature profile of objects 18 and the road surface edging 20. The controller 16 in turn generates an infrared image of the road area 12 on a display 22 (such as a monitor or HUD) so as, for example, to help a user make driving decisions. The monitoring system further comprises a user operated input means 24, which may be in the form of a multi-position switch.

In the illustrated embodiment, the switch 24 can be moved by a user between four positions 1, 2, 3, 4. The controller 16 is associated with a memory 26, in which is stored the table of FIG. 3. This table provides the grey value allocation for each switch position 1, 2, 3, 4 with reference to detected temperature intervals/profiles, e.g. the temperatures of the objects 18, 20 in the image of the road area 12.

Using the switch 24 and its associated changes 1, 2, 3, 4 to the grey value allocation, a user can affect which set of grey values is allocated to each range of objects 18, 20. The user can therefore customize the image on the display 22 to suit his or her particular eye sight requirements or wishes.

It is, furthermore, possible to change the displayed image such that it is in fact the road surface 20 which appears brighter than the adjacent areas 18. This makes it easier for a user to concentrate on the direction of the road 20, and thereby improves driving safety, especially at night or in conditions of poor visibility, such as in fog.

Changes to the allocation of grey values could also be made using other user actuating means 24 such as a voice operated controller, which could be arranged in use to assign a different set of grey values to high and/or low temperatures in response to each of a pre-defined set of voice commands.

The changes made to the assignment to objects in the image on the display 22 of particular grey values in response to changes in the current driving situation, are not limited to purely manual changes instigated by a switch means such as the grey value allocation switch 24. The current driving situation can be taken account of automatically, such that the manual changes to the allocation of grey values could be altered or supplemented automatically by a driving situation assessment means 27.

Such a driving situation assessment means can take a variety of forms and could, for example, be implemented in software. It could, for example, be implemented by an expert system on the basis of a controller assessment of the built-up image and surrounding situation or perhaps on the basis of the driving context of the vehicle using an input such as might be obtained from a navigation system 28. Furthermore, the allocation of grey values to particular temperature intervals need not be linear. Through the freer allocation of grey values to temperatures, a picture could be made adaptive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A monitoring system including a device arranged to display an image generated using an infrared detector, and being capable of changing an assignment of grey values to temperatures of objects in the image, wherein:

said monitoring system further comprises a memory having stored therein a table containing a plurality of alternative assignments of grey values to temperatures of objects sensed by said infrared detector unit, including at least a first assignment in which brighter grey values are assigned to relatively higher temperatures and darker grey values are assigned to relatively lower temperatures, and a second assignment in which brighter grey values are assigned to relatively lower temperatures and darker grey values are assigned to relatively higher temperatures; and changes to said assignment of grey values are made by selection of an assignment from said table in said memory in response to a user operated input means.

2. A system according to claim 1, wherein said input means comprises a multiposition switch, each position of which assigns a different set of grey values to high and/or low temperatures.

3. A system according to claim 1, wherein said input means comprises a voice operated controller which assigns a different set of grey values to high and/or low temperatures in response to each of a pre-defined set of voice commands.

4. A system according to claim 1, wherein additional changes can be made to the assignment of grey values, or manual changes altered, automatically in response to a driving situation assessment means.

5. A system according to claim 4, wherein said driving situation assessment means includes an input from a navigation means.

6. A vehicle having a monitoring system including a device arranged to display an image generated using an infrared detector, and being capable of changing an assignment of grey values to temperatures of objects in the image, wherein:

said monitoring system further comprises a memory having stored therein a table containing a plurality of alternative assignments of grey values to temperatures of objects sensed by said infrared detector unit, including at least a first assignment in which brighter grey values are assigned to relatively higher temperatures and darker grey values are assigned to relatively lower temperatures, and a second assignment in which brighter grey values are assigned to relatively lower temperatures and darker grey values are assigned to relatively higher temperatures; and changes to said assignment of grey values are made by selection of an assignment from said table in said memory in response to a user operated input means.

7. A monitoring system comprising:

an infrared detector unit;

a video display;

a memory having stored therein a table containing a plurality of alternative assignments of grey values to temperatures of objects sensed by said infrared detector unit, including at least a first assignment in which brighter grey values are assigned to relatively higher temperatures and darker grey values are assigned to relatively lower temperatures, and a second assignment in which brighter grey values are assigned to relatively lower temperatures and darker grey values are assigned to relatively higher temperatures; and a control unit coupled to receive an input signal from said infrared detector, for generating a grey scale image on said video display, according to an assignment of grey values selected from among said assignments contained in said table in said memory; and user input means for selecting an assignment of grey values from said table, according to a user preference.

8. A monitoring system according to claim 7, wherein said user input means comprises a multiposition switch, each position of said switch causing said control unit to effect a different assignment of grey values.

9. A system according to claim 7, wherein said input means comprises a voice operated controller which assigns a different set of grey values to high and/or low temperatures in response to each of a pre-defined set of voice commands.

* * * * *